Jan. 9, 1968

J. H. REED 3,362,227

PRESSURE DIFFERENTIAL INDICATING SYSTEM FOR FLUID FLOW

Filed Aug. 5, 1965

INVENTOR.
JOHN H. REED

BY
ATTORNEYS.

Jan. 9, 1968                J. H. REED                3,362,227
              PRESSURE DIFFERENTIAL INDICATING SYSTEM FOR FLUID FLOW
Filed Aug. 5, 1965                                  2 Sheets-Sheet 2

INVENTOR.
JOHN H. REED

BY *Kimmel, Crowell & Weaver*
ATTORNEYS.

United States Patent Office 3,362,227
Patented Jan. 9, 1968

3,362,227
PRESSURE DIFFERENTIAL INDICATING
SYSTEM FOR FLUID FLOW
John H. Reed, Kermit, Tex., assignor to Trimeter Manufacturing Company, Kermit, Tex., a corporation of Texas
Filed Aug. 5, 1965, Ser. No. 477,515
13 Claims. (Cl. 73—407)

ABSTRACT OF THE DISCLOSURE

This differential pressure measuring system has a pair of pressure sensing bellows connected together by a linearly reciprocable shaft. Three rotatable pointers are connected to the reciprocable shaft by means of a motion transmitting device which includes gear and cam mechanisms for registering three different ranges of differential pressure measurements.

---

This invention is an improvement over application Ser. No. 335,032 filed Jan. 2, 1964, now Patent No. 3,304,779, and relates to a means for measuring a pressure drop created in a conduit carrying flowing fluids, and more particularly to a device for translating the reciprocable movement of a bellows shaft into the movement necessary to rotate a pointer with respect to a dial or an ink-carrying pen with respect to a chart. The aforementioned application provides a plurality of pointers, each measuring the reciprocable movement of a bellow shaft, as may be seen in FIGURES 3 and 4 thereof, to provide a reading expressed in units of pressure directly readable on a scale or dial, as may be seen in FIGURE 5 thereof.

One disadvantage inherent in the provision of a plurality of pointers detecting the same movement and giving a output reading in varying degrees of accurary is that the speeding up of a pointer to give more accurate readings requires a larger arc on a dial or scale. There may be several avenues of attempting to overcome this disadvantage, but it will be found that there must be provided some means of limiting the movement of the pointers associated with the scales of higher accuracy.

For purposes of illustration it is assumed that three pointers are detecting a linear movement of a body edge and that one of these pointers translates this movement into a pointer arc of 40°. To allow the remaining pointers to translate the same linear movement into the same pointer arc defeats the object of readings of greater accuracy. To allow the remaining pointers to translate the same linear movement into arcs of, for example, 80° and 120°, allows readings of greater accuracy, but results in a large bulky instrument carrying a dial providing 120° of pointer arc.

The aforementioned application provides one means of avoiding this problem, as shown in FIGURES 8, 10, and 11 in said application and the explanatory material relating thereto, which discloses and explains the use of a spring in the linkage leading to the pointer to avoid overtravel thereof. This has been found to be not altogether suitable since the use of a spring tends to affect the accuracy of the associated pointer and since there is created a series of mechanical stresses within the transmission linkage and pointer which is deleterious to accuracy and long life of carefully made small components.

An object of the instant invention is to provide a pressure differential measuring and indicating device having a plurality of pointers or pens associated with dials or charts of differing degrees of accuracy.

Another object of the instant invention is to provide a geared motion transmission device for translating a linear reciprocable movement into movement necessary to rotate a pointer or ink filled pen.

Still another object of the instant invention is to provide a geared motion transmitting device for translating the linear movement of a bellows shaft of a pressure differential measuring device into different rates of pointer movement thereby providing pointers of differing degrees of reading accuracy.

A further object of the instant invention is to provide a pressure differential measuring device having a plurality of pointers of differing degrees of accuracy in which the pointers of higher accuracy move at a higher rotary speed than pointers of lower accuracy.

A still further object of the instant invention is to provide a pressure differential measuring device having a plurality of pointers moving at differing rates across scales of substantially equal sizes to allow a compact measuring and indicating device.

A still further object of the instant invention is to provide a measuring device which translates a linear movement into pointer movement of varying rates in which a motion limiting means precludes overtravel of a high speed pointer.

A more specific object of the instant invention is to provide a motion transmitting device for translating a linear movement into movement necessary to rotate pointers at varying rates providing an unbiased motion limiting means precluding overtravel of the high speed pointers.

Other objects and advantages of the instant invention reside in the combinations of elements, arrangements of parts, and features of construction and operation, all as will be more fully pointed out hereinafter and disclosed in the accompanying drawings wherein there is shown a preferred embodiment of this inventive concept.

Figure 1:
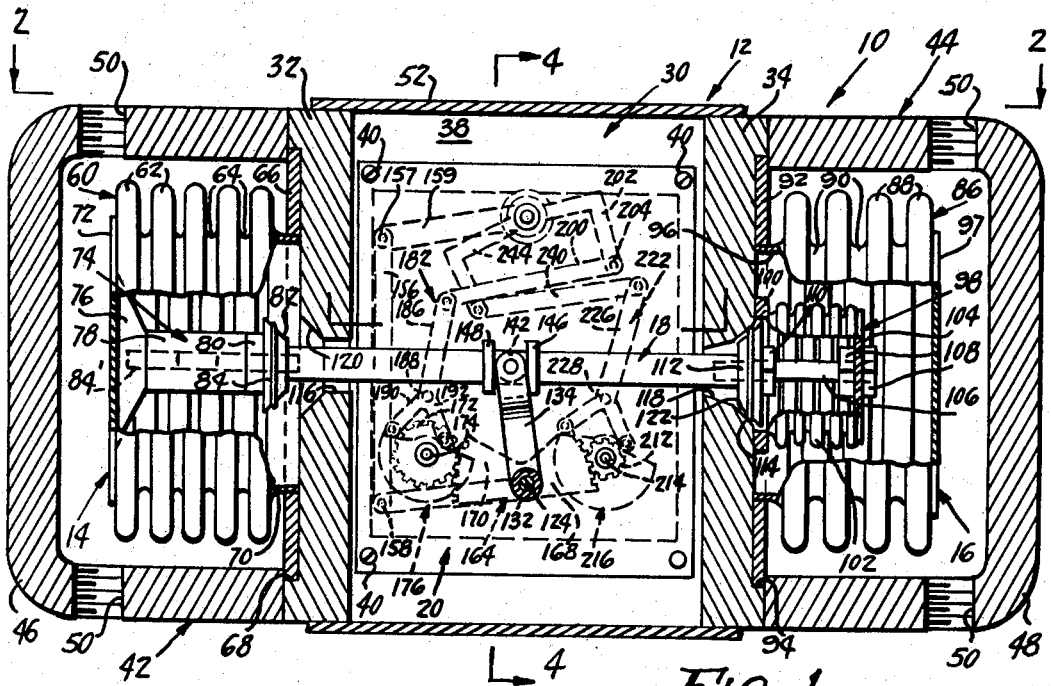
FIGURE 1 is a cross-sectional view of a pressure differential measuring and recording device illustrating expandable and compressible bellows connected with a motion transmitting device.

Referring now to the drawings in detail, wherein like reference characters designate like elements throughout the several views thereof, there is indicated generally at 10 a pressure differential measuring and recording device having as its major components a housing indicated generally at 12, a pair of spaced apart bellows designated generally at 14, 16 connected by a shaft denominated generally at 18 in operative engagement with a motion transmitting means shown generally at 20, and an indicating means shown generally at 22 comprising a plurality of pointers 24, 26, 28.

Figure 2:
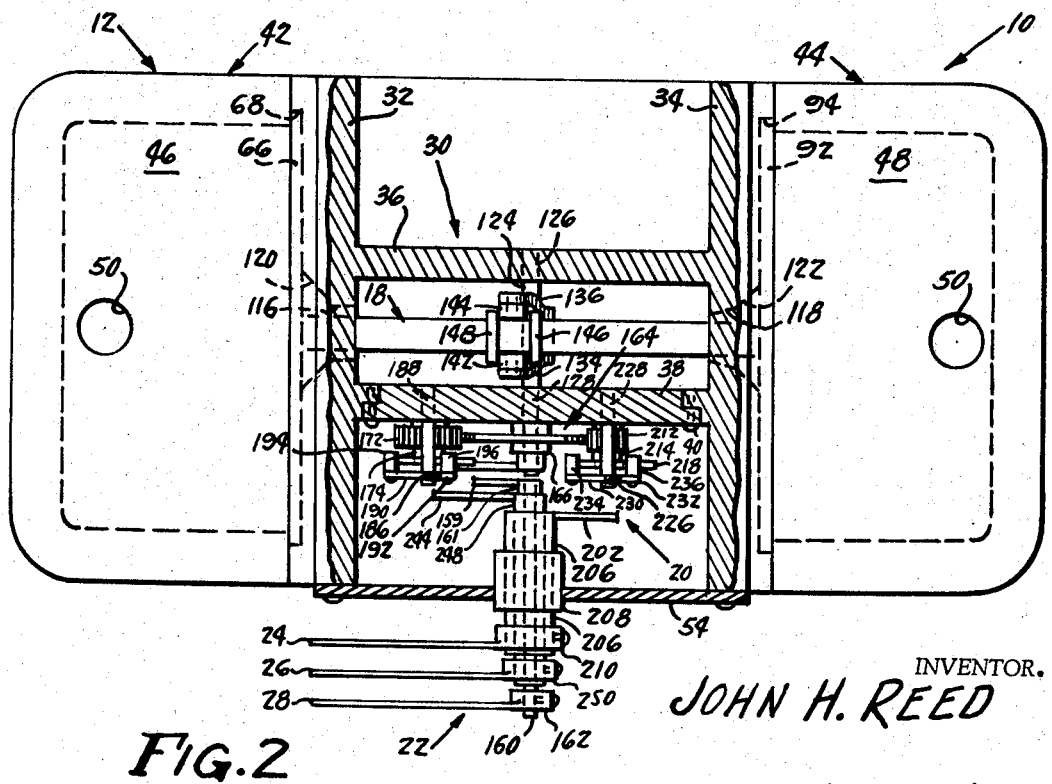
FIGURE 2 is a view of the pressure differential measuring and recording device of FIGURE 1 as may be seen from line 2—2 viewing in the direction of the arrows illustrating the connection of the motion transmitting device of FIGURE 1 in plan.

Housing 12 includes a central supporting structure shown generally at 30 providing a pair of vertical spaced apart parallel transverse walls 32, 34, connected together by a pair of longitudinal vertical parallel spaced apart walls 36, 38, a portion of the latter being removable by detaching screws 40 as may be seen in FIGURES 1 and 2 to provide access interiorly of walls 36, 38. Housing 12 also includes a high pressure inlet receptacle shown generally at 42 and a similarly constructed low pressure inlet receptacle shown generally at 44.

Each of inlet receptacles 42, 44 includes a generally cup-shaped housing 46, 48 secured in any conventional manner to transverse walls 32, 34 of central supporting structure 30. Cup-shaped housings 46, 48 are provided with a plurality of threaded inlet openings 50, some of which may be plugged with a threaded plug (not shown) as desired.

Closing the outer sides of central supporting structure 30 is a top wall 52, a front wall 54, a bottom wall 56 and a semi-cylindrical rear wall 58. It will be noted from FIGURES 1 and 2 that housing 12 provides a series of compartments for high pressure bellows 14, low pressure bellows 16, shaft 18, and motion transmitting means 20 with indicating means 22 being positioned outwardly thereof.

Bellows 14 includes an expandable and compressible casing shown generally at 60, which is preferably made of rubber or the like, but which may be made of any suitable material, having a plurality of alternating circumferential ridges 62 and depressions 64. Bellows 60 is mounted on transverse wall 32 by an annular flange 66 extending in a slot 68 formed by the junction of cylindrical cup-shaped housing 46 and transverse wall 32 with annular flange 66 secured to an end 70 of bellows 60. Closing bellows 60 is a circular plate 72 with a compressible inert captive fluid filling the interior bellows 60 to avoid collapse thereof.

Mounted interiorly of bellows 60 and connected to circular plate 72 is a connecting means 74 including a truncated conical section 76, a cylindrical section 78, and a valve carrying plug 80 on which is mounted a truncated conical valve 82 carrying an O-ring 84. The components of connecting means 74 are secured to bellows shaft 18 by a spline or the like 84.

Bellows 16 is of generally similar configuration to bellows 14 and includes an expandable and compressible casing shown generally at 86 made of rubber or the like providing alternating ridges 88 and depressions 90 allowing for the expansion and compression thereof. Casing 86 is secured to transverse wall 34 by an annular flange 92 fitted in a slot 94 formed by the juncture of wall 34 and cylindrical casing 48. Flange 94 is connected to casing 86 by end 96 with a circular plate 97 closing the movable end of casing 86 so that a captive inert gas may be placed therein.

Mounted interiorly of casing 86 is a range spring means shown generally at 98 comprising an annular ring 100 secured to wall 34, an expansible and compressible bellows casing 102 and a bellows plate 104. Range spring 98 is secured to bellows shaft 18 by a shank 106 secured by threaded nuts 108 to bellows plate 104. Shank 106 mounts a valve carrying plug 110 carrying a truncated conical valve 112 providing an O-ring 114.

Transverse walls 32, 34 of housing 12 form a pair of transversely aligned openings 116, 118 with a valve seat 120, 122 formed adjacent conical valves 82, 112. As may be seen in FIGURE 1, bellows shank 18 extends between openings 116, 118 with valves 82, 112 being positioned for engagement with valve seats 120, 122.

When pressure differential measuring and recording device 10 is connected to a conduit carrying moving fluids, a pressure differential creating device, such as an orifice plate or a Venturi, as disclosed in the aforementioned application, will be provided in the flow line with the upstream or high pressure side being connected to high pressure inlet receptacle 42 and the downstream or low pressure side being connected to low pressure inlet receptacle 44. High pressure fluids within inlet receptacle 42 will compress bellows 14 thus reciprocating shaft 18 to the right as seen in FIGURE 1 with the compressed inert captive fluid within casing 60 transmitting the increased pressure through the space between longitudinal walls 36, 38 into range spring means 98.

The lower pressure fluid within low pressure receptacle 44 will compress bellows 16 thus transmitting an increased pressure against bellows plate 104 of range spring means 98. The difference in pressure created across an orifice or a Venturi will thus result in the positioning of bellows shaft 18 at a particular location, the resilient effects of bellows casing 102 of range spring means 98 precluding overshift thereof such that the relative location of bellows shaft 18 is directly proportional to the drop in pressure created by the pressure differential creating orifice or Venturi.

It should be noted that a very high pressure differential will result in the seating of valve 82 associated with bellows 14 in valve seat 120 thus placing an upper limit upon the utilization of device 10 and obviating the destruction of the mechanism by a freakish pressure drop across a Venturi or orifice. As will be more fully explained hereinafter, motion transmitting means 20 will detect the relative location of bellows shaft 18 and translate this location into a reading which may be observed from the exterior of device 10.

Motion transmitting means 20 includes a first or main shaft 124 journaled in a pair of transversely aligned openings 126, 128 in longitudinal walls 36, 38. Main shaft 124 carries between longitudinal walls 36, 38 a bifurcated bracket shown generally at 130 which includes a collar 132 fixedly secured to shaft 128 and a pair of upstanding arms 134, 136 secured to collar 132 and, together, forming a Y-shaped configuration. Secured to the upper end of arms 134, 136 by screws 138, 140 is an inwardly facing boss 142, 144. Positioned at the center of shaft 18 is a pair of upstanding circular flanges 146, 148, spaced apart a distance to receive bosses 142, 144.

It will be seen that the reciprocable movement of shaft 18 will result in the lateral displacement of bosses 142, 144 resulting in the rotation of shaft 124. As more fully explained hereinafter, pointers 24, 26, 28 are operatively engaged with shaft 124 to designate the amount of pressure differential necessary to shift shaft 18.

Figure 4:
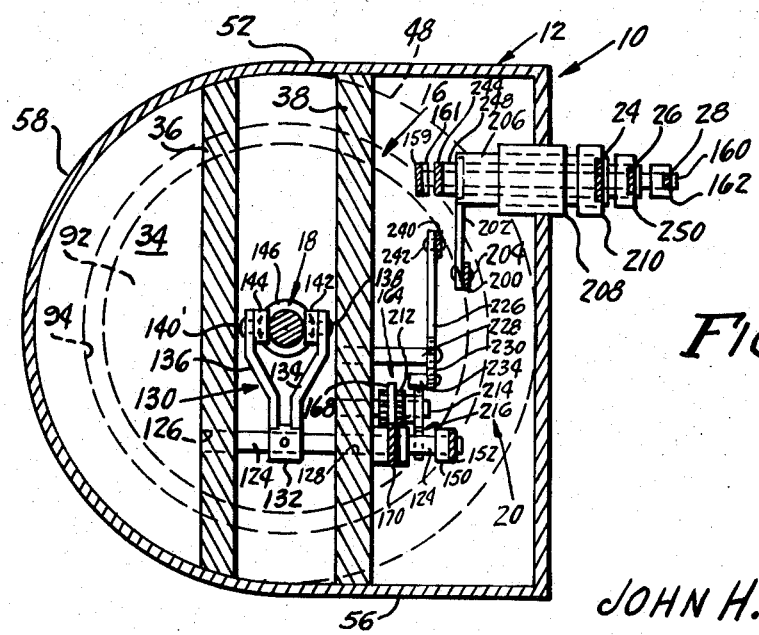
FIGURE 4 is a transverse cross-sectional view of the pressure differential measuring and recording device of FIGURE 1 taken along line 4—4 and viewing in the direction of the arrows.

As may be seen in FIGURE 4, shaft 124 extends outwardly of longitudinal wall 38 and has fixedly mounted on the end thereof a collar 150 fixedly mounting a straight lever or arm 152 of pointer linkage system 154 leading to small scale pointer 28. As used herein, the "small scale" refers to a scale such as scale 150 in application Ser. No. 335,032, and is one having a minimum of zero and a maximum which corresponds to the maximum pressure recording of the instant device. Straight lever arm 152 is secured to one end of an upstanding lever 156 by a free pivot connection 158 with the other end of arm 156 being mounted by another free pivot 157 to a lever 159 carrying a collar 161, carrying a shaft 160 fixedly secured to a hub 162 carrying pointer 28 as may be seen in FIGURE 2.

A primary gear shown generally at 164 is fixedly mounted by a collar 166 on main shaft 124 and is preferably bifurcated, thus providing two gear tooth sections 168, 170, although a generally semicircular primary gear may be used. A circular intermediate scale gear 172 is pivotally mounted in longitudinal wall 38 by a pin 174. Pin 174 extends outwardly of gear 172 and fixedly carries a cam means shown generally at 176 providing a pair of flat camming surfaces 178 having a bulge or hump 180 therebetween. As more fully explained hereinafter, cam means 176 constitutes an important part of the instant inventive concept.

In the operation of motion transmitting means 20, pivoted arms 134, 136 will detect the linear displacement of bellows shaft 18 and rotate main shaft 124 in direct proportion to this displacement. Straight lever arm 152 of small scale pointer linkage system 154 is likewise rotated thus rotating pointer 28 to indicate exteriorly of device 10 the pressure differential measured by bellows 14, 16. Primary gear 164, which is larger than intermediate scale gear 172, will likewise rotate with shaft 124 and straight lever arm 152 of pointer linkage system 154.

Since intermediate scale gear 172 is of smaller diameter than primary gear 164, intermediate scale gear 172 will rotate at a more rapid rate than either of straight lever arm 152 or primary gear 164. It will be seen, therefore, that intermediate scale gear 172 allows a more accurate reading of the pressure differential measured by bellows 14, 16.

An intermediate scale pointer linkage system shown generally at 182 is in operative engagement with camming surface 178 of cam means 176 and transmits the rotation thereof to intermediate scale pointer 26. Intermediate scale pointer linkage system 182 includes a lever shown generally at 184 including a straight shank 186 rotatably mounted on a pivot pin 188 onto longitudinal wall 38 as may be seen in FIGURES 2 and 3. Lever 184 includes a pair of bifurcated arms 190, 192 carrying a pair of roller bearings 194, 196 on the ends thereof in engagement with camming surface 178.

Figure 3:
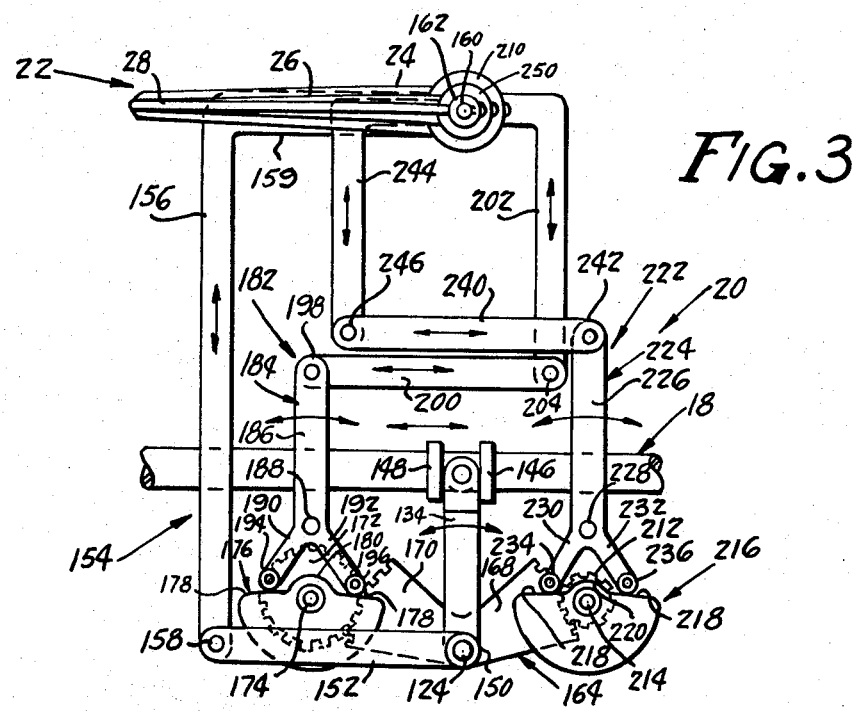
FIGURE 3 is an enlarged view of the motion transmitting device and pointer connection of FIGURES 1 and 2.

It will be seen that the rotation of intermediate scale gear 172 will result in an equal rotation of cam means 176 with roller bearings 194, 196 translating this rotation of cam means 176 into rotation of lever arm 184. Assuming for purposes of illustration that cam means 176 is turning in a counterclockwise direction as seen in FIGURE 3, roller bearings 194, 196 will be moving in an upward and leftward direction until roller bearing 196 contacts bulge 180 in cam means 176 which will act to cease the rotation of lever 184. It should be noted when roller bearings 194, 196 are moving along camming surface 178, lever 184 will be rotating at a greater rate than lever 152 of smaller scale pointer linkage system 154. Accordingly, a pointer associated with lever 184 will give a reading of higher accuracy.

Pivotally mounted on the free end of lever 184 as by a free pivot 198, is a straight lever arm 200 which in turn connects to the long leg of an L-shaped lever arm 202 by a free pivot 204. L-shaped lever arm 202 is fixedly connected to a collar 204 rotatably mounted in a bearing 208 secured in front wall 54 and fixedly carries a hub 210 on the end thereof mounting intermediate scale pointer 24. A large scale gear 212 is rotatably mounted on wall 38 by a pivot pin 214 which carries on the outer end thereof a cam means shown generally at 216 providing a pair of flat camming surfaces 218 and a centrally mounted bulge or hump 220 which operates as a movement limiting means in much the same manner that bulge 180 of cam means 176 operates. A large scale pointer linkage system shown generally at 222 connects cam means 216 to large scale pointer 26 and includes a lever arm shown generally at 224 providing a straight shank 226 pivotally mounted by a pivot pin 228 and including a pair of bifurcated arms 230, 232 carrying a pair of roller bearings 234, 236 in engagement with flat camming surfaces 218.

It will be seen that large scale gear 212 rotates at a higher rate than either primary gear 164 or intermediate scale gear 172 with the result that cam means 216 likewise rotates at a high rate. Roller bearings 234, 236 translate the rotary movement of cam means 216 into the rotary movement of lever arm 224 such that lever arm 224 rotates at a higher rate than either of lever arms 184 or 156 of intermediate and small scale pointer linkage systems 182, 154. It is seen therefore that large scale pointer linkage system 222 transmits a higher accuracy reading to large scale pointer 28 as more fully explained hereinafter.

Large scale pointer linkage system 222 includes a straight lever arm 240 pivotally secured to lever 224 by a free pivot 242. Straight lever arm 240 is secured to the long leg of an L-shaped lever arm 244 by another free pivot 246 with the short leg of L-shaped lever 244 secured to collar 248 fixedly carrying on its end a hub 250 mounting large scale pointer arm 26. Although it is illustrated that collars 206, 248, 158 are coaxial (FIGURE 2) it should be understood that they may be separately mounted in front wall 54 as may be indicated by a comparison of FIGURES 7 and 9 of application Ser. No. 335,032.

In the operation of pressure differential measuring and indicating device 10, bellows 14, 16 will detect the pressure differential achieved by a pressure drop creating device, such as a Venturi or orifice as previously explained, resulting in the linear reciprocation of bellows shaft 18. Bifrucated arms 134, 136 will translate this reciprocable linear movement of bellows shaft 18 into a corresponding rotational movement of main shaft 124 with small scale pointer linkage system 154 translating this rotation into a corresponding rotary movement of small scale pointer 28. A suitable series of dials may be placed on front wall 54 such that a direct reading may be made or, a clock-driven chart may be positioned adjacent front wall 54 with pointer 28 carrying an ink-filled pen to permanently record the pressure differentials measured.

The same rotary movement of main shaft 124 that rotates small scale pointer linkage system 154 also rotates primary gear 164 which in turn rotates both intermediate scale gear 172 and large scale gear 212. Since intermediate scale gear 172 effects greater than a one-to-one ratio of rotary movement between shaft 124 and lever arm 184, intermediate scale pointer linkage system 182 will produce a higher accuracy reading than small scale pointer linkage system 154 will achieve. It should be noted that intermediate gear 172 and large scale gear 212 will rotate at a rapid rate and, without a motion limiting means, such as bulges 180, 220, pointers 24, 26 will describe a very large arc. Since it is desirable to provide a compact dial, rather than a very large dial, motion limiting means 180, 220 cease the continued rotation of pointers 24, 26 beyond a predetermined arc provided by a scale.

It is now seen that there is herein provided an improved pressure measuring and indicating device having all of the objects of this invention and others, including many advantages of great practical utility and commercial importance.

Since many embodiments may be made of the instant inventive concept, and since many modifications may be made in the embodiment hereinbefore shown and described, it is to be understood that the foregoing is to be interpreted merely as illustrative and not in a limiting sense.

I claim:
1. A pressure differential measuring and recording device comprising
 a pair of compressible bellows means connected together by a linearly reciprocable shaft for measuring a pressure differential,
 a plurality of rotatable pointer means for indicating the pressure differential measured by said bellows, and
 motion transmitting means connecting said reciprocable shaft to said plurality of pointer means for translating the linear movement of said shaft into movement sufficient to rotate said pointer means, said motion transmitting means including a rotatable main shaft in operative engagement with said reciprocable shaft and said pointer means and cam and follower means for transmitting motion to said pointer means simultaneously.

2. The structure of claim 1 wherein said motion transmitting means includes a plurality of gears of different sizes operatively connected with said main shaft.

3. The structure of claim 2 wherein some of said gears carrying said cam means, and said follower means comprises a bearing carrying arm movably mounted adjacent each of said cam means, said bearing arm being in bearing engagement with said cam means.

4. The structure of claim 3 wherein said cam means includes means limiting the movement of said bearing arm.

5. A pressure differential measuring and recording device comprising
   a housing,
   a pair of compressible and expansible bellows means mounted in said housing connected together by a linearly reciprocable shaft for measuring a pressure differential,
   a plurality of movably mounted pointer means mounted exteriorly of said housing for indicating the pressure differential measured by said bellows, and
   motion transmitting means connecting said reciprocable shaft to said plurality of pointer means for translating the linear movement of said shaft into movement sufficient to displace said pointer means, said motion transmitting means including an arm pivotally mounted on said shaft fixedly carrying a main shaft perpendicular to said arm whereby rotation of said pivotally mounted arm rotates said main shaft and cam means for transmitting motion to at least one pointer means.

6. The structure of claim 5 wherein said motion transmitting means includes a small scale pointer linkage system having a first lever fixedly secured to said main shaft and a second lever pivotally mounted on said first lever in fixed engagement with one of said pointer means whereby rotation of said main shaft throughout its maximum travel turns said one pointer throughout its maximum travel.

7. The structure of claim 6 wherein said motion transmitting means includes a primary gear fixedly mounted on said main shaft, a large scale gear of different diameter than said primary gear rotatably mounted on said housing in meshing engagement with said primary gear, said cam means is carried by said large scale gear including a camming surface, a large scale pointer linkage system having a bearing in engagement with said camming surface for controlling the movement of another of said pointer means, said cam means including a motion limiting means for interrupting and stopping the movement of said bearing along said camming surface to limit the travel of said pointer.

8. The structure of claim 7 wherein said large scale gear is of lesser diameter than said primary gear.

9. The structure of claim 7 wherein said motion transmitting means includes an intermediate scale gear of different diameter than said primary gear and said large scale gear rotatably mounted on said housing in meshing engagement with said primary gear, a cam means carried by said intermediate scale gear including a camming surface, an intermediate scale pointer linkage system having a bearing in engagement with said camming surface for controlling the movement of another said pointer means, said cam means including a motion limiting means for interrupting and stopping the movement of said bearing along said camming surface to limit the travel of said last-mentioned pointer.

10. The structure of claim 9 wherein said intermediate scale gear is of lesser diameter than said primary gear and of greater diameter than said large scale gear.

11. The structure of claim 5 wherein said motion transmitting means includes a primary gear fixedly mounted on said main shaft, a gear of different diameter than said primary gear rotatably mounted on said housing in meshing engagement with said primary gear, said cam means being carried by said gear including a substantially flat camming surface, a pointer linkage system having a bearing in engagement with said camming surface for controlling the movement of one of said pointer means, said cam means including a motion limiting means for interrupting and stopping the movement of said bearing along said camming surface to limit the travel of said pointer.

12. The structure of claim 11 wherein said motion limiting means includes a bulge in said camming surface.

13. The structure of claim 12 wherein said cam means includes said flat camming surface, said bulge, and another flat camming surface, said camming surfaces and said bulge being in substantial alignment, said large scale pointer linkage system including a pair of bifurcated arms, one of said arms carrying said bearing in engagement with one of said flat camming surfaces, another of said bifurcated arms carrying a bearing in engagement with another of said flat camming surfaces, said bulge being positioned between said bearings.

References Cited

UNITED STATES PATENTS

| | | | |
|---|---|---|---|
| 1,816,995 | 8/1931 | Armstrong et al. | 346—65 XR |
| 2,632,474 | 3/1953 | Jones. | |
| 2,674,121 | 4/1954 | Gorman | 73—407 XR |

FOREIGN PATENTS

| | | |
|---|---|---|
| 890,715 | 9/1953 | Germany. |

LOUIS R. PRINCE, *Primary Examiner.*

DONALD WOODIEL, *Assistant Examiner.*